UNITED STATES PATENT OFFICE.

WALTER PERRY, OF ANSONIA, CONNECTICUT.

CEMENT FOR CASTINGS.

SPECIFICATION forming part of Letters Patent No. 714,647, dated November 25, 1902.

Application filed July 26, 1902. Serial No. 117,182. (No specimens.)

*To all whom it may concern:*

Be it known that I, WALTER PERRY, a citizen of the United States, residing at Ansonia, in the county of New Haven, in the State of Connecticut, have invented new and useful Improvements in Cements for Castings, of which the following is a specification.

The object of my invention is to provide a plastic composition which can be readily applied to the rough or crude surfaces of iron or steel castings or other similar metals; also, to make tight joints in furnaces and heaters, cast-iron and steam-pipe joints, or which may be used for any other purpose where a plastic composition is required to perfect a surface, seal a joint or the like.

The principal object of my invention, however, is to perfect surfaces of iron and steel castings. As is well known in the art of metal-founding, when the castings are first removed from the mold they are sometimes filled with blow-holes and have rough and irregular surfaces, so that the same must be ground, filed, and polished before the crude material is ready for commercial use. To obviate this difficulty, it is the purpose of my invention to provide a composition which may be applied to the surfaces of the castings to fill up the blow-holes and present a smooth surface on the same. As is stated in my application, Serial No. 116,729, filed on or about July 23, 1902, for an improvement in cements for castings, I utilize a composition consisting of iron, plaster-of-paris, and Portland cement, to which is added silicate of soda and powdered alum, all mixed in certain proportions to produce a filler of the texture desired, which on being moistened is sufficiently plastic to take in all of the irregularities in the surfaces of the castings and when left for a period of several hours is sufficiently hardened, so as to be an integral part thereof. Although this mixture makes a very desirable composition for the purpose stated, yet I find by experiment that should I omit the Portland cement, silicate of soda, and powdered alum and add a small quantity of dextrine or gum-arabic the composition sets better and has greater adhesive qualities. I also find that the addition of a certain proportion of ground glass will give the composition a brighter color when finished, making the surface resemble that of a polished casting. The proportions of my composition may be varied to make the same more suitable, according to the different purposes for which it is utilized—as, for instance, the decrease in proportions of plaster-of-paris may cause a slower setting, while the addition of a small quantity of sulfate of potassium or sodium will cause a quicker setting, and, further, other changes in the proportions will give the results required, according to the nature of the use of the composition. I do not wish my invention to be limited, however, to a composition the constituents of which are combined in any definite proportions, for my composition is operative for all purposes desired in substantially the following proportions in a mixture of one hundred parts, by weight: fifty to ninety parts, by weight, powdered iron; eight to thirty-five parts, by weight, plaster-of-paris; two to fifteen parts, by weight, dextrine or gum-arabic; five to twenty-five parts, by weight, ground glass; one-half to five parts, by weight, salt of sodium or potassium.

It is not necessary that I should use the salt or sulfate of potassium or the ground glass, their use being obvious and their omission not destroying the utility of the mixture, and, further, dextrine or gum-arabic, either one or the other, may be used, as desired.

In mixing the above composition I first grind all the constituents to a fine powder. I then sift and mix, forming a mechanical mixture. This is a fine powder, and it is the commercial form of the composition. In using I add a very little water and mix the same until the cement is moistened, but not wet. Afterward I apply the mixture, which is now plastic, with a putty-knife to all blow-holes, cracks, or rough surfaces on the joints or castings. The plastic composition is then further applied to the desired smoothness or finish with a putty-knife, leaving the cement to harden for twenty-four hours or more. The surface of the mixture is then further finished with emery-cloth or a file to obtain the appearance desired. The composition will then harden and become an integral part of the metal to which it is applied.

I am fully aware that in the art exists compositions made of plastic material mixed with adhesive constituents for the purpose of producing brick and artificial stone, and I am also aware that there exist fillers for celluloid surfaces, I am not, however, aware that all of the ingredients of my composition have been used together.

What I claim, and desire to secure by Letters Patent of the United States, is—

1. A composition of matter consisting of iron, plaster-of-paris and an adhesive constituent, substantially as described.

2. A composition of matter consisting of iron, plaster-of-paris and an adhesive constituent, and a silicous constituent for brightening purposes, substantially as described.

3. A composition of matter consisting of powdered iron, plaster-of-paris, and an adhesive constituent and a silicous constituent for brightening purposes, and a salt of sodium or potassium.

4. A composition of matter consisting of powdered iron, plaster-of-paris and dextrine, substantially as described.

5. A composition of matter consisting of powdered iron, plaster-of-paris, dextrine, and ground glass, substantially as described.

6. A composition of matter consisting of powdered iron, plaster-of-paris, dextrine, ground glass, and a salt of potassium or soda, substantially as described.

7. The herein-described composition of matter consisting of fifty to ninety parts of powdered iron, eight to thirty-five parts of plaster-of-paris, two to fifteen parts of dextrine, five to twenty-five parts of ground glass, and one-half to five parts of a salt of sodium or potassium.

In testimony whereof I have signed my name to this specification in the presence of two subscribing witnesses.

WALTER PERRY.

Witnesses:
ELSIE L. PAGE,
ADA M. GISNER.